Dec. 15, 1925.　　　　　　　　　　　　　　　　1,565,615
A. M. BATES ET AL
MACHINE FOR MAKING AND FILLING BAGS
Filed May 20, 1919　　　12 Sheets-Sheet 1

Witness.
Edward T. Wray.

Inventors.
Adelmer M. Bates.
Johann F. Dancker.
by Parker & Carter
Attorneys.

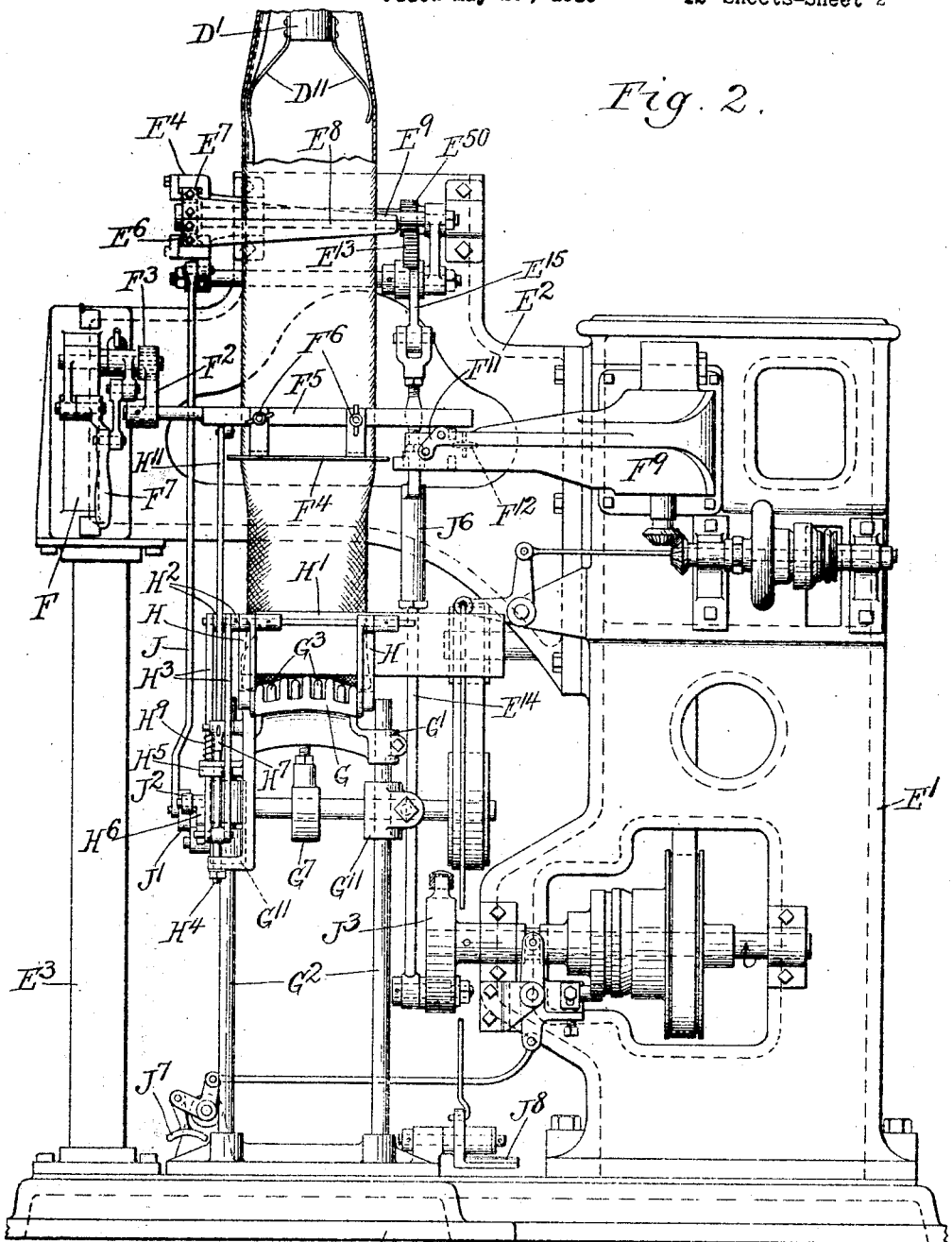

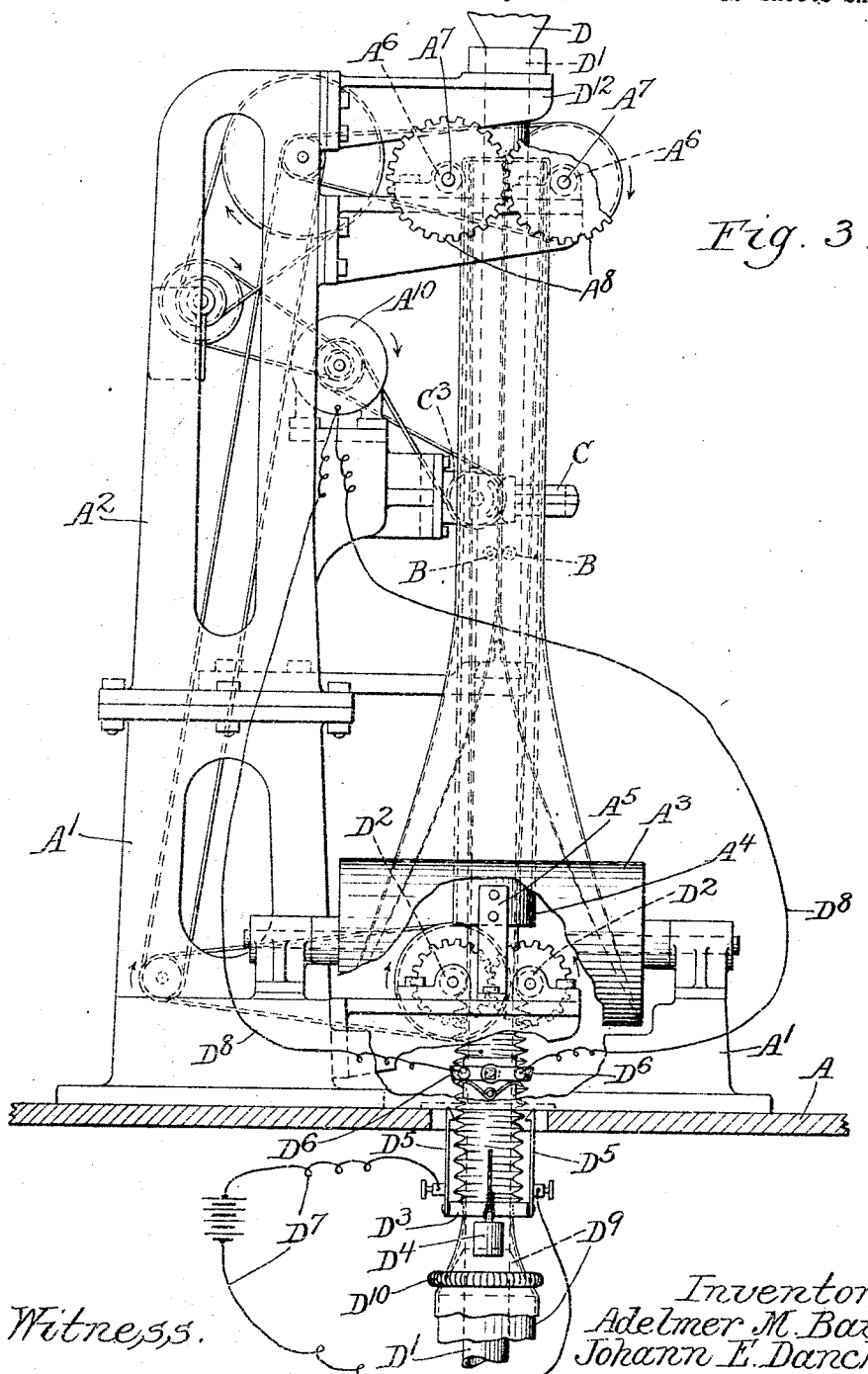

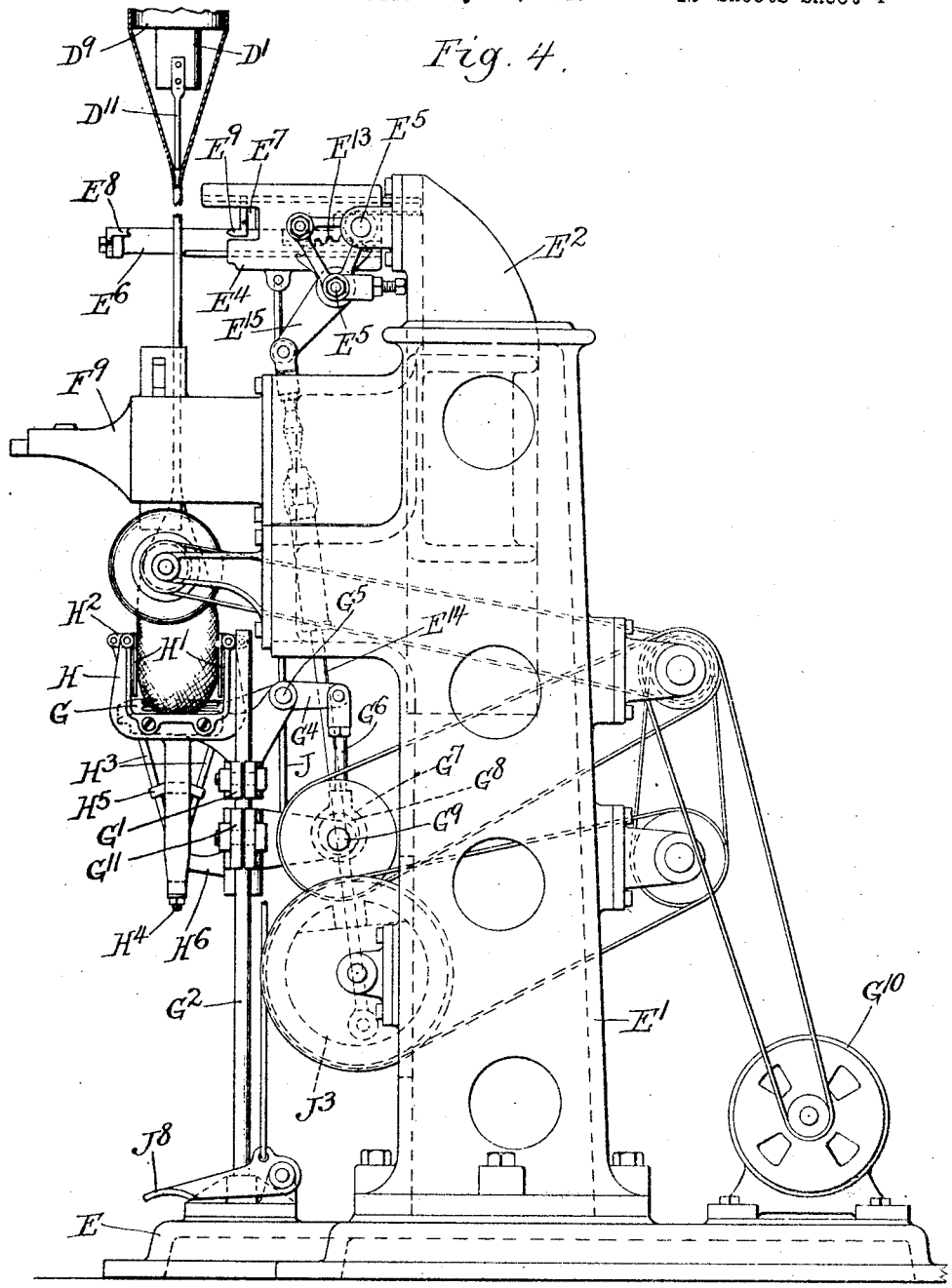

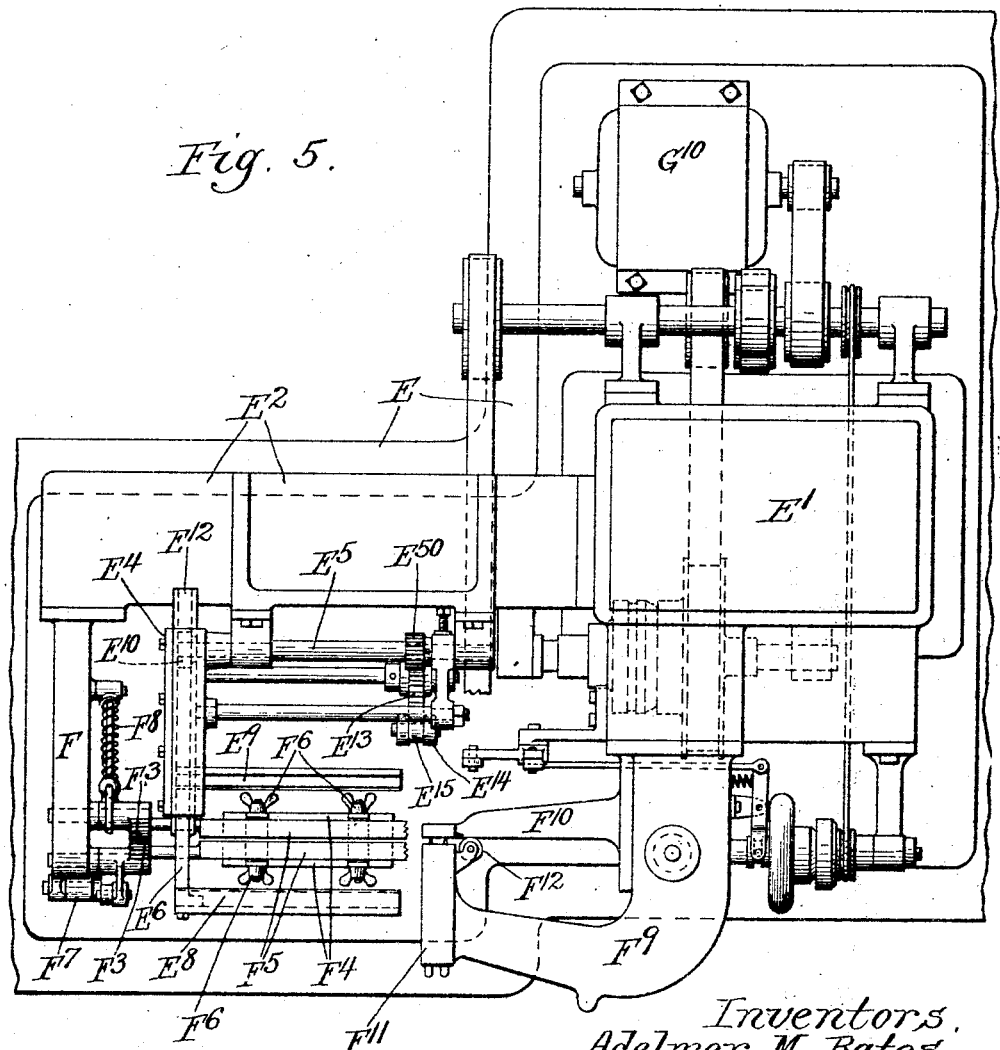

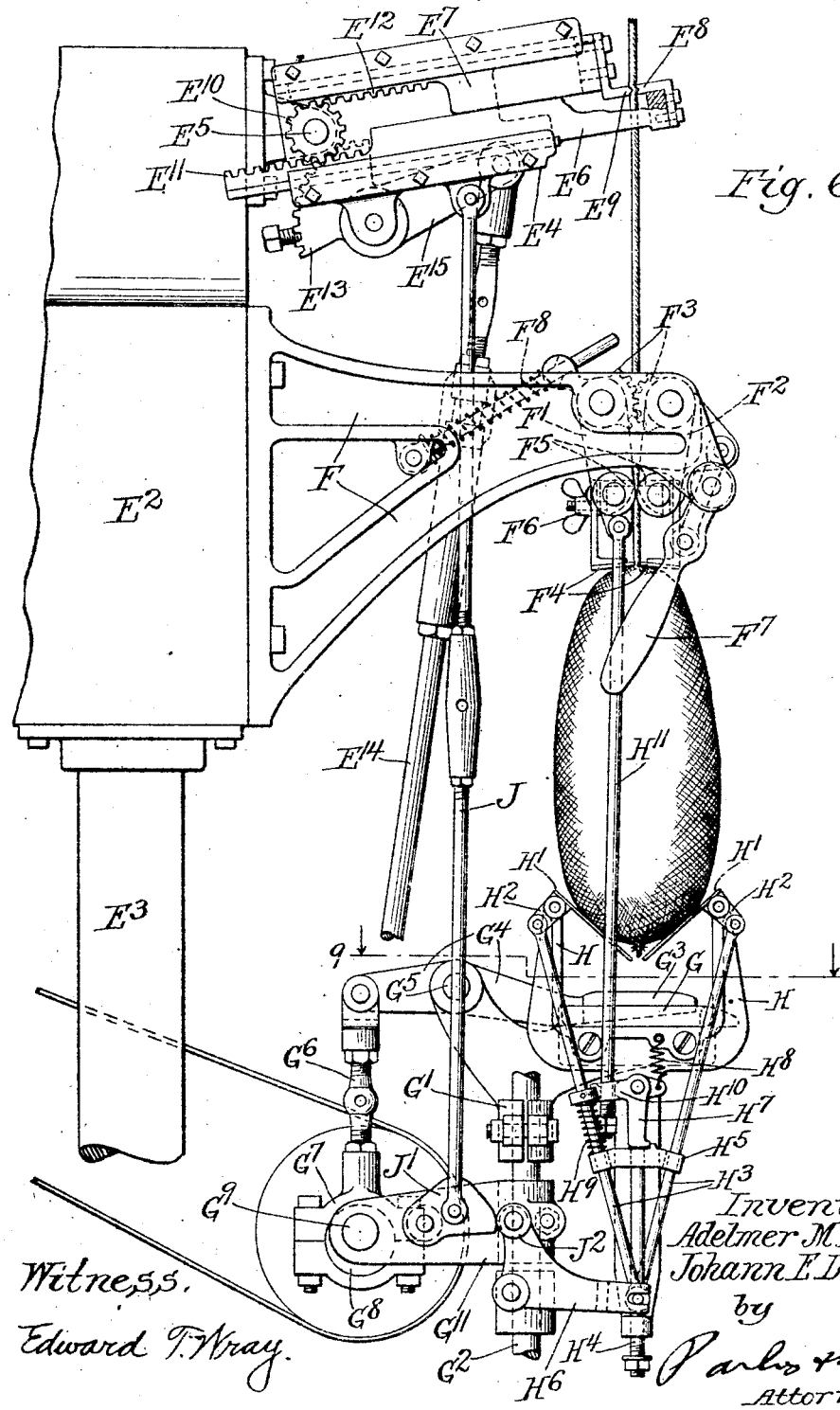

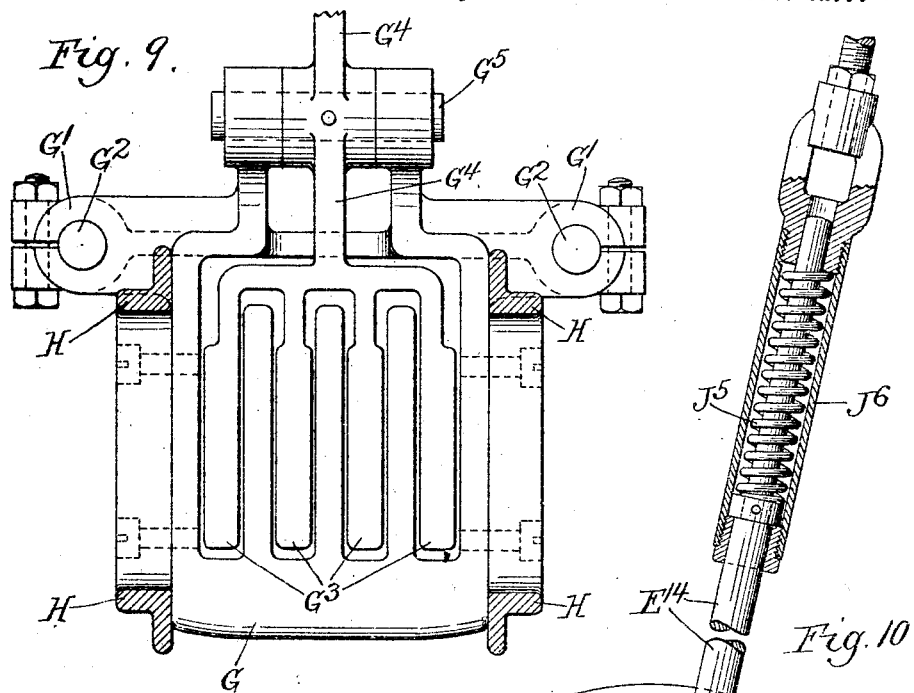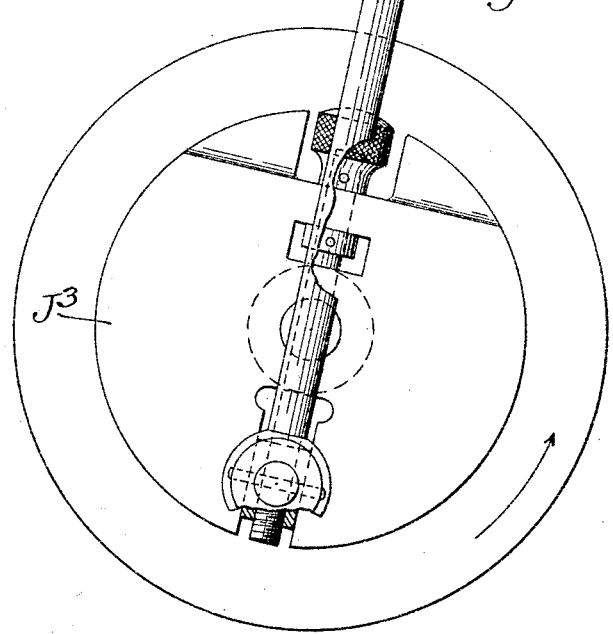

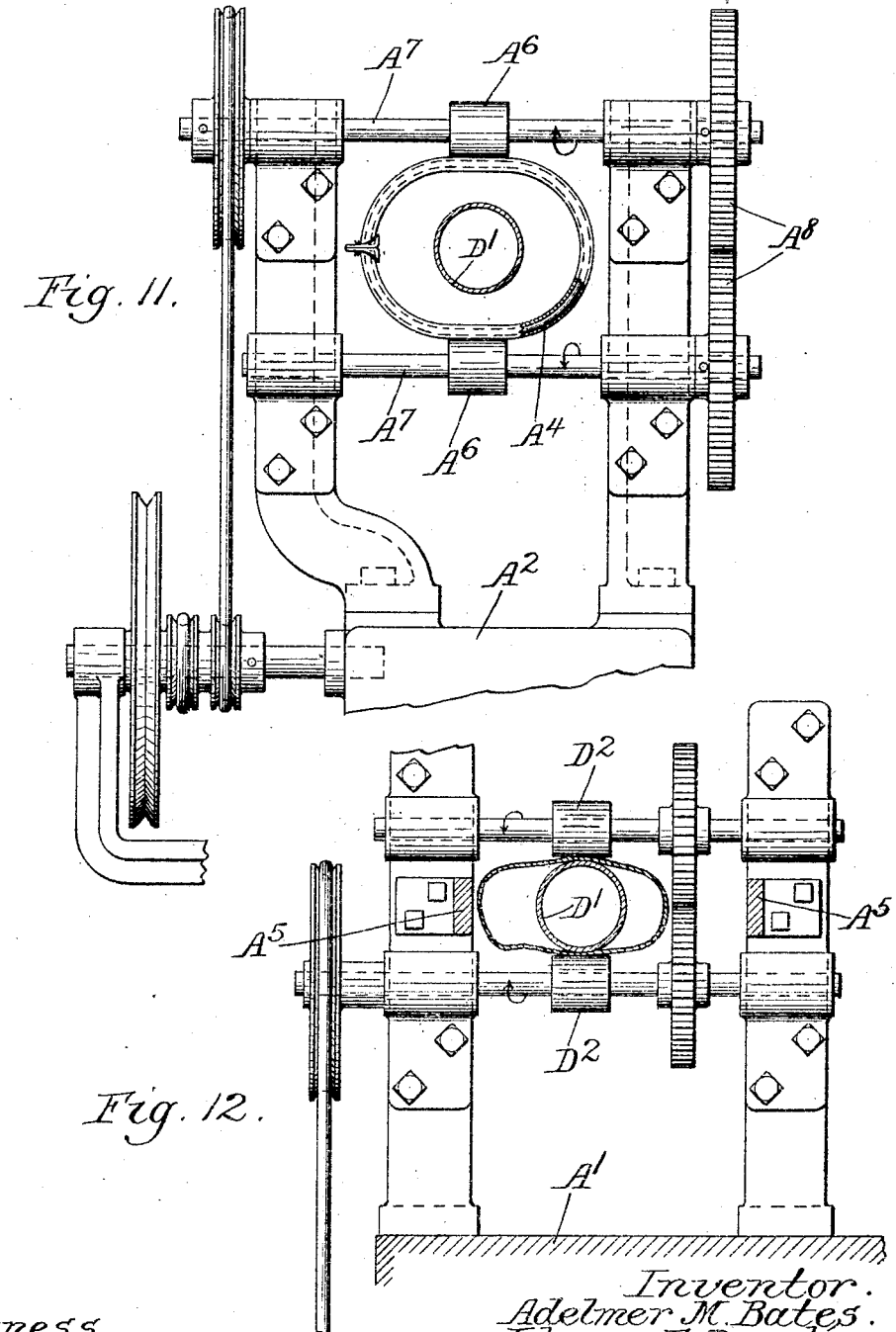

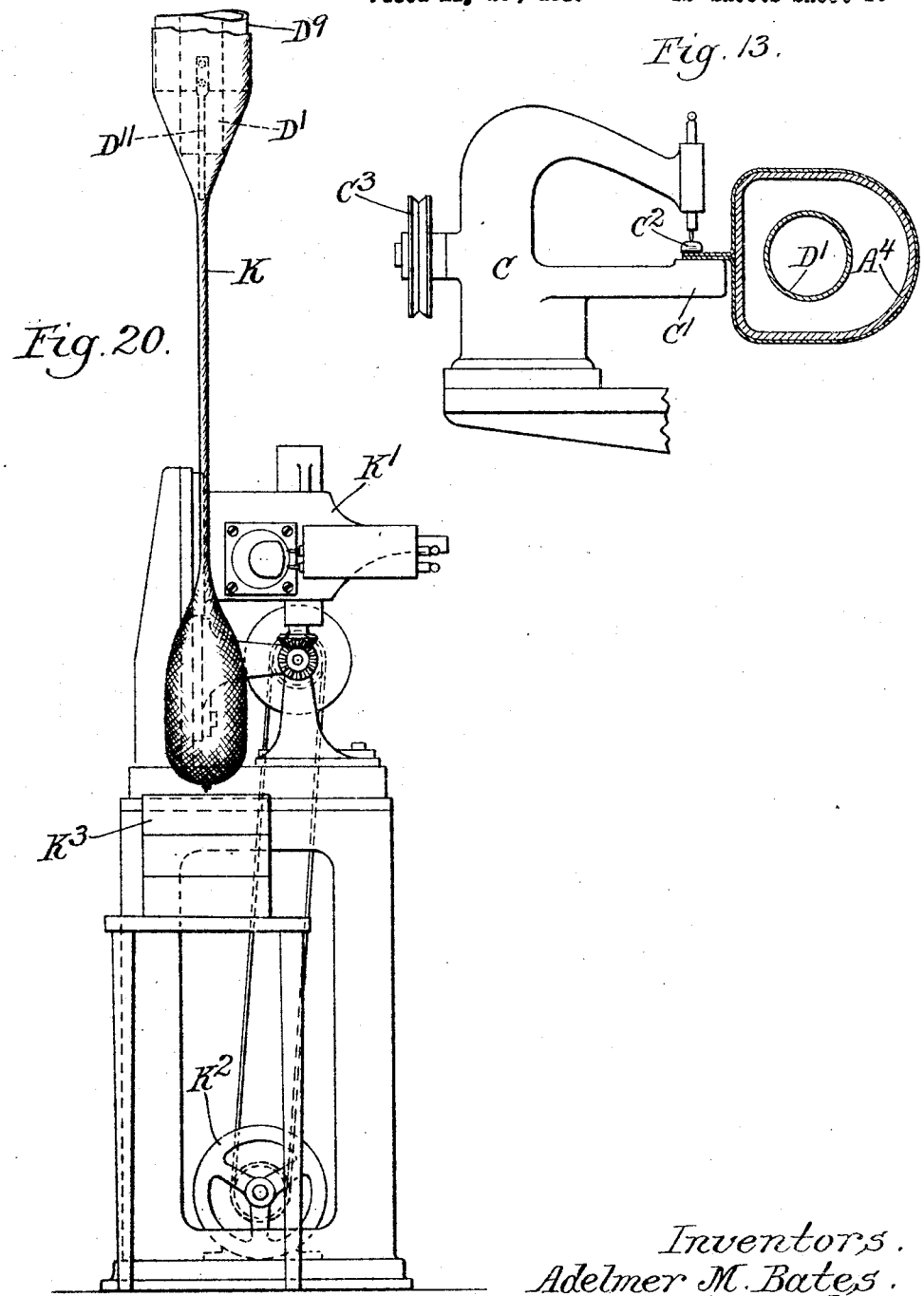

Dec. 15, 1925.
A. M. BATES ET AL
1,565,615
MACHINE FOR MAKING AND FILLING BAGS
Filed May 20, 1919    12 Sheets-Sheet 11
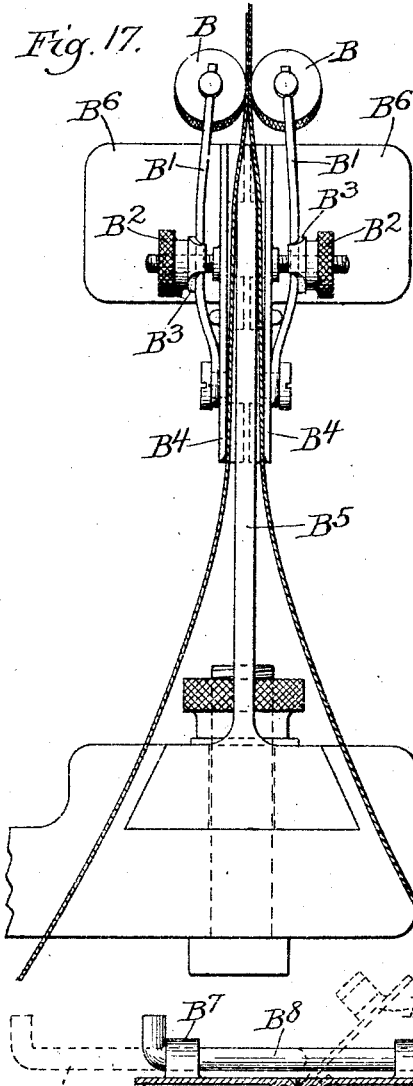
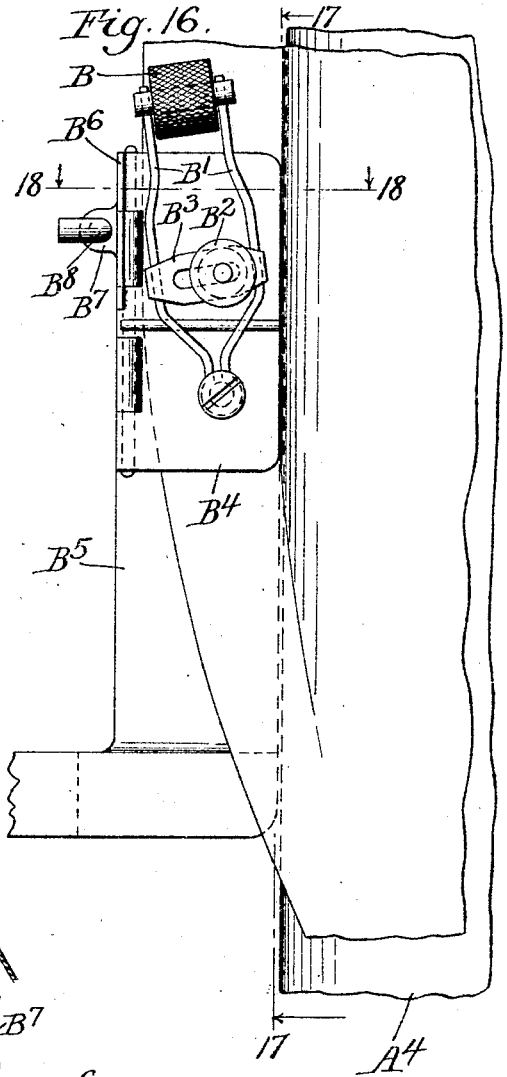
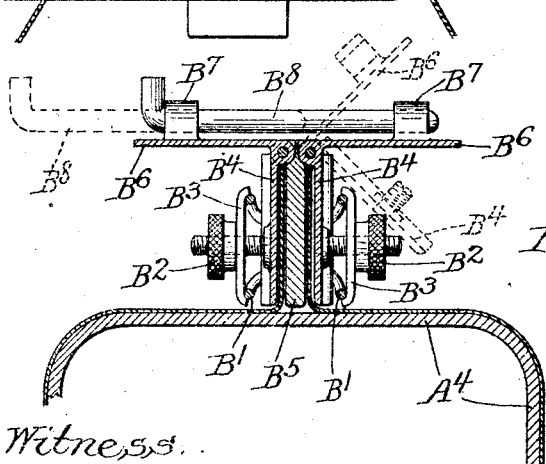
Inventor.
Adelmer M. Bates
Johann E. Dancker.
Witness
Edward T. Wray.
by Parker & Carter
Attorneys.

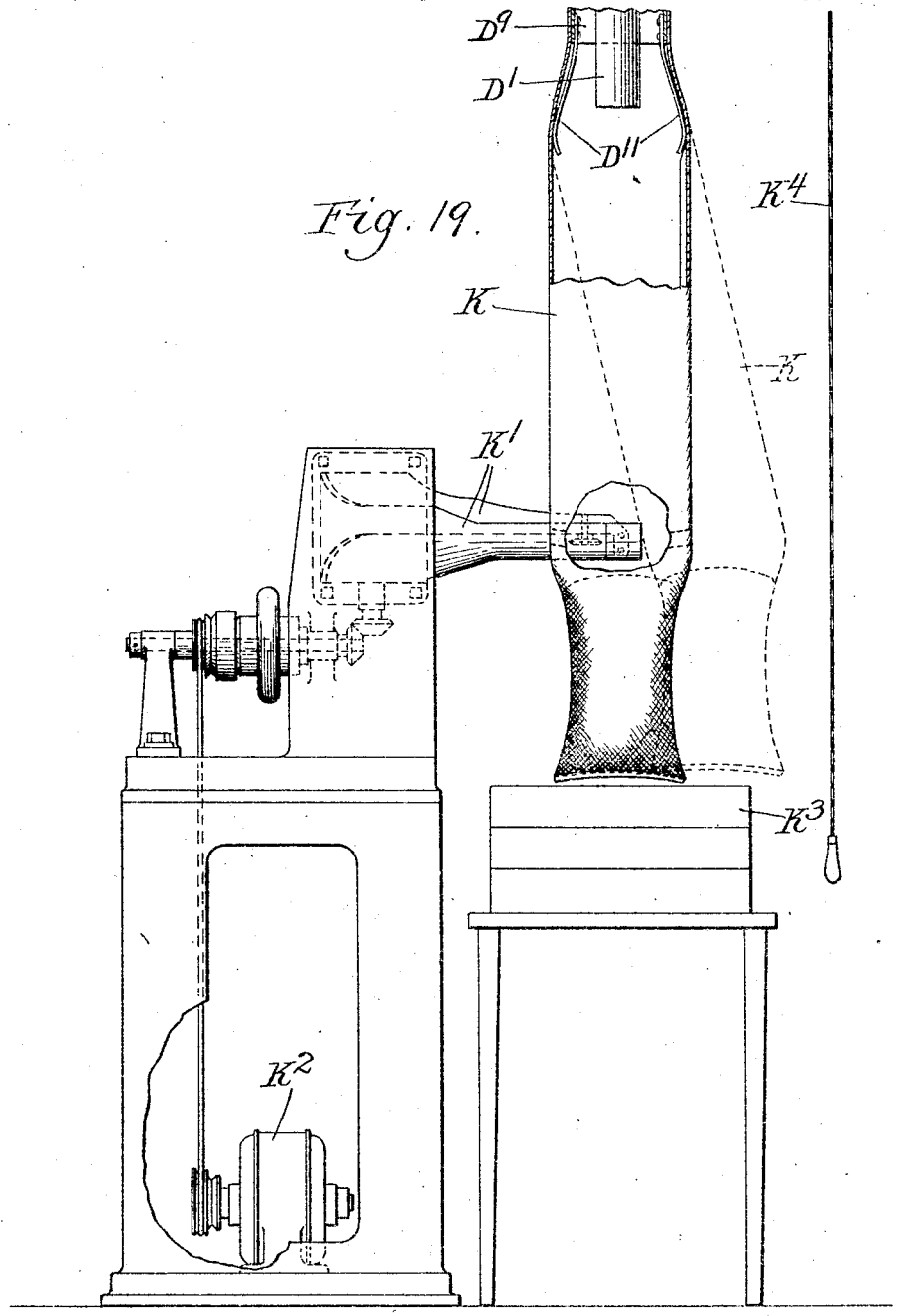

Patented Dec. 15, 1925.

1,565,615

UNITED STATES PATENT OFFICE.

ADELMER M. BATES AND JOHANN E. DANCKER, OF CHICAGO, ILLINOIS, ASSIGNORS TO BATES VALVE BAG COMPANY, OF CHICAGO, ILLINOIS, A CORPORATION OF WEST VIRGINIA.

MACHINE FOR MAKING AND FILLING BAGS.

Application filed May 20, 1919. Serial No. 298,452.

*To all whom it may concern:*

Be it known that we, ADELMER M. BATES, a citizen of the United States, and JOHANN E. DANCKER, formerly a subject of the Emperor of Germany, and now a citizen of Germany, each residing at Chicago, in the county of Cook and State of Illinois, have invented a certain new and useful Improvement in Machines for Making and Filling Bags, of which the following is a specification.

Our invention relates to a machine for making and filling bags. It comprises means, separate in a certain sense but still intimately co-operating, for first making a continuous tube from a roll of preferably printed or previously prepared fabric, which tube is, after it is made, turned inside out and drawn down around an inner filling tube. Somewhere below the filling tube, means are provided for sewing up the open end of the fabric tube and means are also provided for tamping or packing or jigging the material into the closed lower end of the tube after a charge of said material has been placed in the bag by the filling tube. Means then operate to pull the tube up, to stretch the fabric, compress the loose material in the top of the charge, and take up all the slack of bag material. While the fabric is thus held tight, the upper bag seam is made, the bag being cut away from the tube as the seam is being made. Two transverse seams are made simultaneously by a double needle sewing machine, so that as the bag is made and discharged the end of the tube is closed, ready for the next charge, which is held away from the sewing station, but preferably will have been previously discharged into the tube and be ready to drop down to the end as soon as it is released.

In order to assist the operator in spacing the transverse bag seams and operating the sewing machine, sewing marks are preferably printed on the roll of cloth or bag forming material, and the ordinary trade mark or other similar printing is properly positioned on the roll of cloth, between the sewing marks, so as to come in the proper place on each bag.

The apparatus which forms the tube comprises two tubes, one within the other. The roll of cloth is drawn up around the outside of the larger tube, being stretched thereabout by cloth drawing or stretching rolls, which have diagonal axes and are milled, so that, as the cloth is drawn between them, they extend the cloth to position its edges for the sewing machine.

Associated with the cloth drawing or stretching rolls, a change in the inclination of which will, of course, tend to vary their lateral feed, may be stops running along the edge of the fabric against which the rolls would feed the fabric, the idea being that we may, particularly if the fabric has a stiff edge, rely possibly largely upon the engagement of the stiff edge with the stop to control the width of the fabric between the seam and the edge.

These stops may be adjusted according to the different hardness or stiffness of the two edges of the bag fabric, and, by proper adjustment of the stops and of the fabric pulling rollers, separately or in unison, we can always arrive at a satisfactory adjustment which will result in bringing the two edges of the fabric into alignment before the side seam is made.

Our invention is illustrated more or less diagrammatically in the accompanying drawings, wherein:

Fig. 2 is a front elevation of the lower or filling and cross seaming portion of the machine;

Fig. 3 is a side elevation of the upper or longitudinal side seaming part of the machine as shown in Fig. 1;

Fig. 4 is a side elevation of the parts shown in Fig. 2;

Fig. 5 is a plan view of that part of the machine shown in Fig. 2;

Fig. 6 is a detailed elevation of a part of the lower filling portion of the machine, the view being taken on the opposite side of Fig. 4 with parts in a different position;

Fig. 9 is a section on an enlarged scale along the line 9—9 of Fig. 6;

Fig. 10 is an elevation of the crank disc and connecting rod with spring casing in section and parts omitted;

Fig. 11 is a section on the line 11—11 of Fig. 1;

Fig. 12 is a section along the line 12—12 of Fig. 1;

Fig. 13 is a section along the line 13—13 of Fig. 1;

Fig. 16 is a side elevation of the fabric stretching device shown in Fig. 1;

Fig. 17 is a section along the line 17—17 of Fig. 16;

Fig. 18 is a section along the line 18—18 of Fig. 16;

Figure 1:
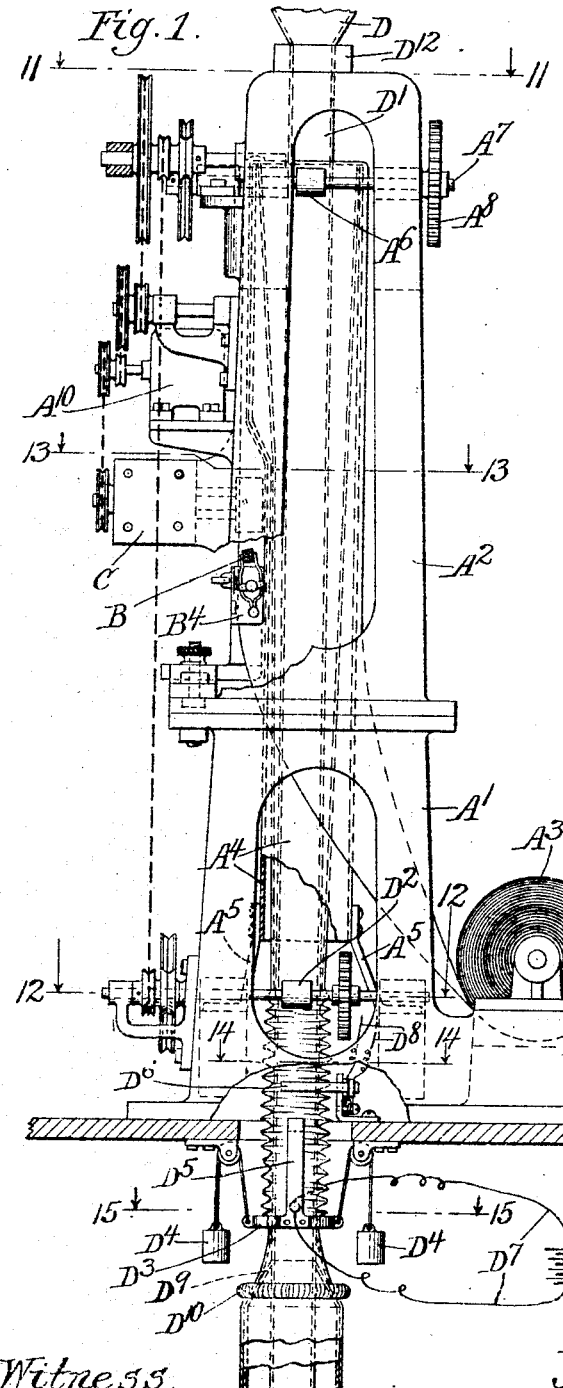
Fig. 1 is a front elevation of the side seaming part of the machine.
Figure 14:
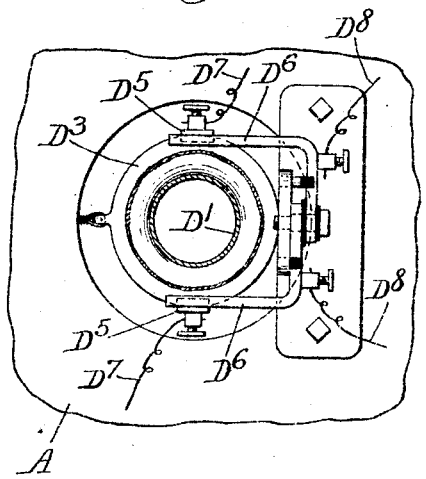
Fig. 14 is a detailed section along the line 14—14 of Fig. 1.
Figure 15:
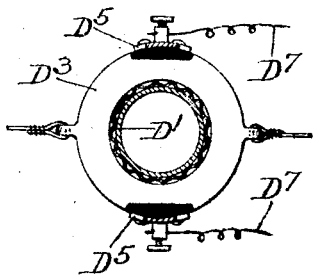
Fig. 15 is a detailed section along the line 15—15 of Fig. 1.
Figure 7:
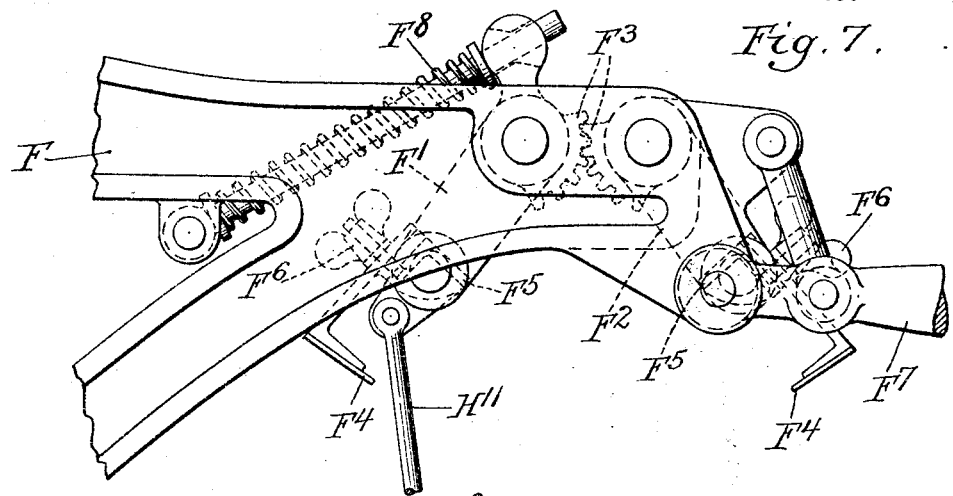
Figs. 7 and 8 are details on a large scale showing the upper and lower bag supports in a different position from that shown in Fig. 6.

Figure 19 corresponds to Figure 2 except that it shows a much simplified form of the device with much of the apparatus and mechanism shown in Figure 2 omitted;

Figure 20 is a side elevation of Figure 19.

Like parts are indicated by like characters in all the figures.

For convenience in description, we have divided our apparatus up into three zones. The first is the weighing zone where material to be packed into the bag is weighed and measured and in time is discharged into a receptacle. The second zone is the fabric tube forming zone where the roll of fabric previously having been printed, is formed into a continuous flowing tube, first inside out with the side seam on the outside, then reversed so that the side seam is on the inside, and then stored ready to be formed into separate bags. The third zone, is the bag filling and forming zone where the material from the weighing zone is discharged into the closed end of the tube and jigged or compacted, and where the bag is sewn up and discharged.

It will be understood, of course, that the operations are being carried on simultaneously and continuously in these three zones, and that the timing of the operations in the weighing and filling zones must be quite accurately correlated so that, as soon as the end of the tube is closed, a charge may be thrown into the bag, and so that no further charge may be thrown in until the first bag has been closed and cut off and the end of the tube has also been closed ready for the next charge. The closing of the upper end of the filled bag and lower end of the tube takes place simultaneously and is immediately followed by the cutting away of the filled bag.

The provision of a storage zone where the tube, after it has been formed, is puckered or piled up at the lower portion of the tube forming zone, protects the side seaming apparatus from any shocks or jolts resulting from the fall of the separate charges into the end of the tube, and makes it unnecessary to have the operation of the filling and transverse seaming zone synchronized closely with respect to the operation of the tube forming zone.

For convenience, we will describe the apparatuses of the second and third zones only. The particular mechanism of the first zone is not necessarily novel and may be of any well known and ordinary type.

Tube forming zone.

A is a supporting platform carrying a machine base $A^1$ and frame $A^2$. $A^3$ is a roll of printed cloth which is to be formed into a continuous flowing fabric tube. $A^4$ is a hollow tube form supported at its lower end only, on legs $A^5$, and steadied at its upper end by the opposed tube feeding rollers $A^6$ engaging its opposite sides. Rollers $A^6$ are mounted on shafts $A^7$, connected by means of gears $A^8$, and driven for rotation in unison through the motor $A^{10}$ by the belt and jack shaft power transmission apparatus, as shown.

The fabric strip is brought around the form and finally stretched thereabout by the inclined cloth stretching rollers B B, which are mounted on similar spring forks $B^1$ $B^1$ held adjustably together by thumb screws $B^2$ $B^2$ engaging slotted yokes $B^3$ $B^3$ on opposed hinge plates $B^4$ $B^4$. These hinge plates also serve as stops to position or engage the edges of the fabric, there being a bracket $B^5$ between the hinge plates upon which they are respectively pivoted. Each plate with the bracket forms a pocket through which the edge of the fabric travels on its way to the point where it is engaged by the stretching rollers. These hinged plates have outwardly extending angle members $B^6$ $B^6$, integral with the plates and provided with lugs $B^7$ $B^7$ adapted to be engaged by lock pin $B^8$, whereby the rollers and hinge plates may be locked in the working position as indicated in full lines in Figure 18, or may be released, when the pin is withdrawn, as indicated by dotted lines, to position the edges of the fabric before the operation commences. The stretching rollers are inclined outwardly with respect to the line of travel of the fabric so as to tend to draw the edges of the fabric out and bring them into alignment with each other and stretch the fabric into form, so as to provide sufficient clearance between the edges of the fabric and the seam to make it possible for the side seaming sewing machine to do its work.

The side seaming sewing machine C is mounted on the frame $A^2$. It has the usual horn $C^1$ against which the folded or parallel edges of the fabric are held by the presser foot $C^2$. The sewing machine is driven by the motor $A^{10}$ through a belt applied to the pulley $C^3$, and operates in the usual manner. Of course, the speed of the sewing machine and the tube feeding or pulling rollers is synchronized so that, when the motor is operated, the rollers rotate in engagement with the fabric tube and draw it up along the form at the speed at which the sewing machine is set to operate.

D is a hopper adapted to catch material discharged from the weighing zone and discharge it into the feeding tube $D^1$, which passes downwardly to and through the tube forming zone and into the filling zone. This tube is, of course, smaller in diameter than, and located inside of, the tube form. So far as the material being packed is concerned, this tube serves merely as a conduit to pass the material downwardly to the filling zone and to protect the tube from contact with the filling material before it is needed. So far as the tube forming zone is concerned, however, this inner feeding tube serves as an inner form to prevent a total collapse of the tube as it passes downwardly inside of the outer tube forming form. This tube is supported only at the top by the bracket $D^{12}$, and is steadied at the bottom by engagement with the tube pulling rollers $D^2$ $D^2$, driven, by means of shaft and belt as shown, in unison with the rollers $A^6$. $D^3$ is what we have called a governor collar. It surrounds the tube $D^1$, there being just room between it and the tube for the loosely collapsed or puckered fabric to be passed through. This governor collar is normally held in the upright position by means of weights $D^4$ $D^4$ and by means of switch hooks $D^5$ $D^5$ engaging switch arms $D^6$ $D^6$, which close the circuit through the conductors $D^7$ $D^8$ to operate the motor $A^{10}$. The relative sizes of this governor collar and inner tube are such that the fabric tube cannot pass between them unless drawn from below. The result is that the continuously downwardly flowing supply of formed fabric tube piles up or puckers up, as indicated, about the feeding tube, until the pressure exerted downwardly by the weight of material finally overcomes the counter-balancing weights and the hold of the spring switch hooks, and forces the governor ring down into the position shown in Figure 1. This breaks the circuit, and the operation of the sewing machine and the flow of the forming tube ceases until the demand for the tube below in the filling zone has drawn out so much of the supply of tubing that the weights are able to pull the governor ring up, close the circuit, and start operation of the sewing machine.

$D^9$ is a tube spreading or clamping cone mounted above the discharge end of the filler tube $D^1$. $D^{10}$ is a spring check or feed ring made up of a circular coiled spring surrounding the fabric tube and holding it against the cone $D^9$. The inclination of the cone and tension of the spring are such that the spring does not slip off the cone but may be drawn down toward its base as the tube is fed down. The resistance to movement on the part of the tube may be varied by changing the inclination of the cone and the tension of the spring, and, in some cases, this resistance might be sufficient to suspend the entire weight of the filled bag, leaving it to the operator to pull out the fabric when needed. At the lower extremity of the filling tube $D^1$ are two yielding bag spreading or stretching fingers $D^{11}$ arranged to spread and flatten the tube. These fingers, of course, will give when necessary to permit an opening of the tube when material is passed into it from the feeding tube.

Bag filling and forming zone.

E is a bed plate mounted on a floor or platform below the floor A. $E^1$ is a frame carried thereby, provided with a bridge $E^2$ supported at its outer end on the bed plate E by a column $E^3$. $E^4$ is a cradle pivoted on a shaft $E^5$ on a lug projecting from the bridge $E^2$. $E^6$ $E^7$ are carriages slidably mounted on the cradle $E^4$ and provided with interlocking jaws $E^8$ $E^9$, adapted to engage the flattened tube when in locking position. These jaws are brought together or separated as the case may be by a pinion $E^{10}$, engaging racks $E^{11}$ $E^{12}$ on the two slides. This pinion is mounted on the shaft $E^5$, which in turn carries a pinion $E^{50}$, engaged by a segmental gear $E^{13}$ rotatably mounted and adapted to be rotated by an adjustable connecting rod $E^{14}$, connected to rock arm $E^{15}$ on shaft $E^5$, the arrangement being such that an upward movement of this rod tends first to draw the jaws together and clamp and grip the tube and then to oscillate the entire mechanism upwardly to pull the tube itself up to the position shown in Figure 6, while a downward movement will result in lowering and separating the jaws, as shown in Figures 4 and 5.

F is a bracket projecting outwardly from the bridge $E^2$ and having oscillatably mounted thereon the levers $F^1$ $F^2$, each provided with meshing segmental gears $F^3$ $F^3$ and carrying parallel and opposed pairs of tube clamping jaws $F^4$ $F^5$, the distance between adjacent pairs being adjustable by means of thumb screws $F^6$. $F^7$ is a hand lever whereby these jaws may be closed, and $F^8$ a spring tending normally to hold them in an open position. The jaws $F^4$ $F^4$ operate as packing jaws when the bag fabric or tube is pulled upwardly by the operation of the clamping and lifting jaws $E^8$ $E^9$, and in order that the slack of the bag fabric may be taken up the jaws $F^4$ $F^5$ do not come into actual engagement but merely steady the fabric with sufficient clearance to permit movement of the fabric between them as it is upwardly pulled. F⁹ is a sewing machine mounted on the face of the frame E¹, having a horn F¹⁰ in opposition to a double needle head F¹¹, in line with the space between the jaws F⁴ F⁵, so that the tube may be drawn forward into the sewing machine by the operator. F¹² is a knife arranged to cut the fabric of the tube between the two seams made by the two needles, to cut off the filled bag and separate it from the end of the tube at the same time that the end of the tube is closed.

G is a jigging cradle mounted adjustably for elevation by means of split collars G¹ on columns G², rising from the bed plate E. This jigging cradle has a slotted bottom. G³ G³ are jigging fingers mounted on a lever G⁴ and adapted, when the lever is rotated on the pivot pin G⁵, to move up and down through the slots in the cradle G and jig the bag or package. The lever G⁴ is adapted to be reciprocated by means of the adjustable connecting rod G⁶, terminating at the lower end in an eccentric collar G⁷, engaging an eccentric G⁸ on the shaft G⁹, which shaft is in turn driven by means of belt and pulleys, as indicated, from the motor G¹⁰. The shaft G⁹ is carried by a bracket G¹¹, which also is slidably mounted on the columns G².

Figure 8:
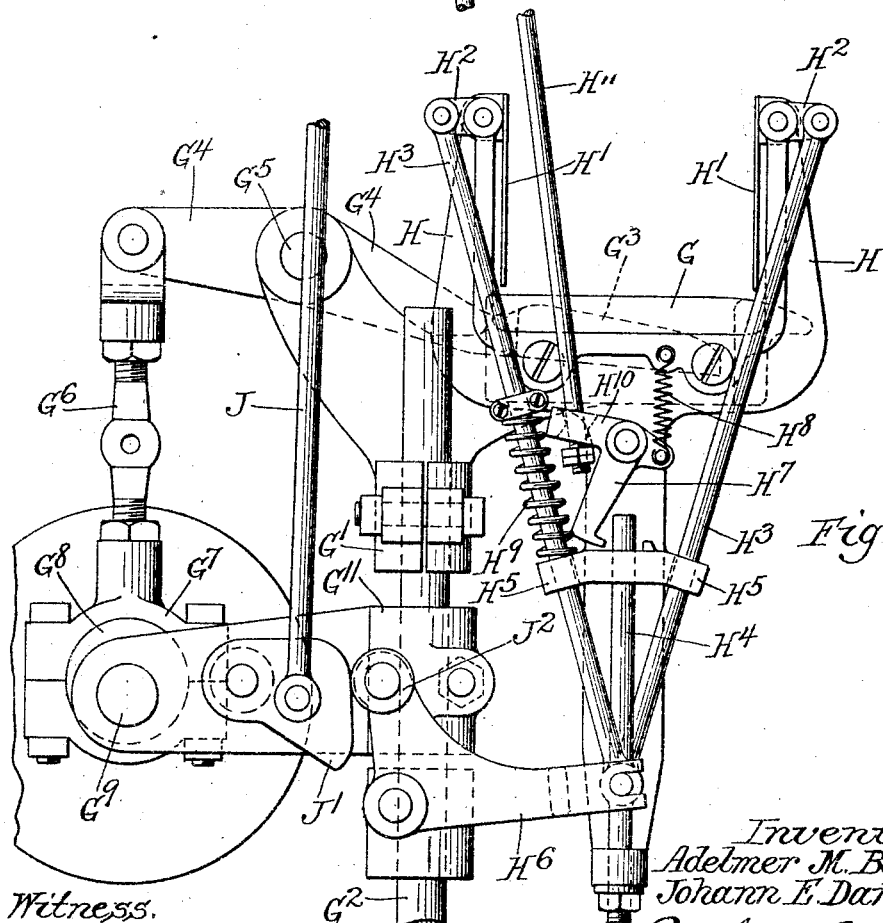

Projecting upwardly from the jigging cradle are arms H H, upon which are oscillatably mounted adjustable floor plates H¹ H¹. These floor plates are controlled by levers H² H² and links H³ H³. These links extend downwardly to and are pivoted on a lock bar H⁴, being guided by members H⁵. When this lock bar H⁴ is downwardly moved by the bell crank lever H⁶ into the position shown in Figure 6, the latch H⁷ is thrown into line with the lock bar by the spring H⁸, whereby the floor plates H¹ are held in upper position to lift the bag off the jigging platform, thus compressing the spring H⁹, which tends normally to assist the force of gravity in urging the floor plates H¹ into the position shown in Figure 8. This latch has a lug H¹⁰, adapted to be moved by the link H¹¹, which is pivotally mounted at its upper end on the member which carries the jaws F⁴ F⁵, so that when the jaws are opened by the hand lever F⁷ the latch is tripped and the floor plates drop down to permit the jigging of the next bag.

The adjustable connecting rod J is pivoted at its upper end on the cradle E⁴ and at its lower end engages a cam J¹, pivoted on the bracket G¹¹. This cam is adapted to engage a roller J² on the bell crank lever H⁶, so that when the clamping and lifting jaws move upwardly the cam is rotated and forces the locking rod H⁴ down and moves the adjustable floor plates H¹ into the position shown in Figure 6, thereby lifting the bag off the jigging platform. J³ is a crank disc driven from the motor G¹⁰ through a clutch controlled by the foot of the operator. E¹⁴ is a connecting rod pivoted at one end on the crank disc and at the other end pivotally engaging the arm E¹⁵ to operate the clamping and lifting jaws. The position of these parts is so arranged that three-eighths of the rotation of the crank disc closes the clamping and lifting jaws, one-eighth rotates them upwardly to lift the fabric, one-eighth brings them down, and three-eighths opens them up. This connecting rod is a two-part one with a spring J⁵ between the two parts and contained within a sleeve J⁶ whereby the pull on the fabric is a yielding spring-like pull to prevent destruction or breakage of any of the parts. J⁷ is a pedal adapted to control the clutch to throw the crank disc into and out of operation, and J⁸ is a pedal adapted to throw the sewing machine into and out of operation. It will be understood, of course, that these two pedals are sufficient to operate the entire mechanism in the bag filling and forming zone, except that previous to the sewing process and previous to the operation of the crank disc the operator will first close the packing jaws so that the lifting jaws will have something to pull against.

It will be evident that while we have shown in our drawings an operative device many changes might be made in size, shape and arrangement of parts without departing materially from the spirit of our invention, and we wish, therefore, that our drawings be considered as in a sense diagrammatic.

In order to more clearly bring this out, we have shown in Figures 19 and 20 a modified form in which much of the mechanism in the filling and forming zone has been omitted.

In Figures 19 and 20 the tube K, as it comes down from the tube forming zone, will be closed off by the operation of the sewing machine K¹, driven from the motor K². The operator merely takes hold of the two sides of the flat collapsed tube and swings it through the sewing machine, making a curved line of stitches, as indicated in the dotted lines. He then pulls down on the bag tube until it comes down as far as the platform K³. He then starts the filling apparatus by pulling on the cord K⁴, and a charge is dumped down through the filling tube to fill the bottom of the fabric tube K. The operator then again swings the tube across the sewing machine and as the two needles sew two parallel arcuate seams the knife cuts off the fabric between them. The operator then throws the bag off the platform, pulls down another length of fabric tube and the process is repeated. In this arrangement, of course, the bag is suspended by means of the frictional resistance which resists the downward movement of the flowing tube, and the platform K³ might very easily be dispensed with and the bag hang free to be manipulated by the operator; or the operator might sit on a chair with a board on her knees upon which the lower end of the bag would rest, and she might or might not jig the contents of the bag merely by raising the board by her knees.

The use and operation of our invention are as follows:—

A printed roll of fabric or other flexible bag forming material is put in place. It is carried by hand up to the top of the hollow bag forming tube. The feeding rollers are rotated and the fabric fed up between the rollers and the top of the form tube. The bag fabric is then pulled down around the form, the stretching rollers being swung aside to permit the edges of the fabric to be put in place between them. The rollers are then swung back into position, the sewing machine is put in place, the power is turned on, and the sewing machine operates as the bag fabric is drawn along past the sewing head by the feeding rollers. The bag stretching rollers can be so positioned or set as to cause the bag fabric to feed out the proper distance away from the form to give the desired width of seam, the tension of the stretching rollers and their angle of inclination being, of course, adjustable.

As the fabric is drawn through the machine, a cylindrical tube is formed. This cylindrical tube will be fed by hand down into and through the form until the lower end comes out below the bottom thereof. At this point the free end of the fabric is fed between the inner feeding tube and the lower bag feeding rollers, and, as soon as the unsewn end of the fabric comes past the lower feeding rollers, it may be cut off. The fabric tube is fed down through the floor, through the governing ring and around the tube spreading cone, the coil spring being put in place on the outside of the fabric tube and resting against the cone to limit and control the flow of fabric tube down around the cone.

As long as the material is not puckered up between the governing ring and the lower tube feeding rollers, the governing ring will remain in its upper position with the arms thereon hooked over the spring held arms above the floor. The movement of the fabric through the tube forming portion or side seaming portion of the apparatus is normally more rapid than the flow of the tube through the balance of the machine, so that the tube will pile up above the governing ring and be puckered around the tube. As soon as this puckering has increased beyond a certain point, further movement downwardly of the fabric tube will exert a pressure on the governing ring sufficient to disengage the hook fingers, thus cutting off the current and stopping the flow of fabric through the tube forming or side seaming apparatus. There will be no further operation of this part of the apparatus until the surplus or storage length of the tube has been drawn out, when the weights will pull the governing collar up, and operation of the side seaming apparatus will be resumed.

Above the side seaming apparatus is a suitable weighing apparatus, not here illustrated. The weighing or measuring apparatus is arranged to periodically weigh out and discharge pre-weighed or pre-measured quantities of material to be packed into the bags. This material falls down through the side seaming apparatus and through the puckered portion of the fabric tube, which is protected from the falling material by the filling tube. This filling tube terminates just below the conical tube forming or expanding member, so that the charge of material fed through this tube is discharged into the fabric tube toward the top of the filling and cross seam apparatus, means not here shown being provided to cause a sufficient synchronization of the weighing or measuring and the cross seaming parts of the apparatus.

The fabric tube is fed further down beyond the tube stretching spring fingers which tend to stretch it out in a flat band. It then passes downwardly between the clamping and bag lifting jaws, which will be open at that time, and then between the packing jaws. The operator will then clamp the clamping jaws together by manipulating the hand lever, and will operate the sewing machine to sew up the open end of the bag tube, forming a double seam. He will then draw out the tube until the lower sewed end rests upon the jigging device, the clamping and lifting jaws and the packing jaws being both open. The material supplying or measuring apparatus will then be operated to drop a charge of material into the lower end of the tube. The jigging device being always in operation will, as soon as there is any load in the lower end of the tube, pack the material therein. The operator then closes the packing jaws by manipulating the hand lever, but these packing jaws do not clamp tightly on the tube. There is a sufficient clearance between them to permit the bag to be pulled out. He then throws the clutch to start rotation of the crank disc. This first closes the clamping and lifting jaws during the first three eighths of the revolution of the disc, and then during the next one eighth of the revolution, lifts, the closed clamping jaws, thus drawing the fabric of the bag back through the packing jaws and compressing additionally any loose material on the top of the bag. Simultaneously with the upward movement of the clamping jaws, the cam will be rotated by the connecting link to pull down on the bell crank at the bottom of the machine and cause the bag supporting panels to rotate upwardly, lifting the bag away from the jigging device so that the tension on the bag fabric will be reduced and the lifting and clamping jaws be able to exert their full force in taking up the slack and additionally packing the material in the bag.

The operator then starts the sewing machine and, seizing the bag in his hands between the upper and lower portions of the packing jaws, pulls the bag sideways past the sewing machine, the two needles of which will sew two parallel seams. The knife immediately beyond the needles will, of course, cut the fabric of the tube between the two seams, and when the cross seaming has been completed the lower end of the tube will have been cut off to form a separate bag. This bag can then be tipped off the bag support and carried away by means not here illustrated.

Meantime, if desired, for the purpose of saving time, a further charge of material may have been dropped down and may be held from further downward movement in the tube either by the clamping and lifting jaws or by the upper portion of the packing jaws, depending upon the timing of the apparatus. In any event, as soon as one bag has been cut off, a charge will be thrown into the lower closed end of the tube, the tube will be drawn down until its lower end rests on the jigging device, and the process is repeated.

The weight of the charge is all that is needed to carry the closed end of the tube down onto the jigging mechanism, and no mechanical means are needed to draw out the bag fabric in the filling zone. The resistance to the downward flow of the fabric caused by the coiled spring is sufficient to keep the fabric tight and prevent the drawing out of more than is needed. Thus the sole function of the mechanical tube propelling means in the tube forming zone is to insure that there will be, at all times, a sufficient store of excess material above the governor rings to insure that when the load drops into the closed end of the tube there will be enough bag material to permit the lower end to drop down and rest on the jigging devise.

The slack taking up apparatus is important because, after the bag is jigged, the loose material takes less space, and, unless the slack in the bag fabric thus left is taken up, great waste of material ensues. Moreover the pressure exerted by the jaws tends to compact the loose material at the top of the package, and produces a bag which is less liable to tear and the contents of which is generally uniform in density and thus of smaller volume than it otherwise would be.

The packing jaws merely furnish an abutment against which the bag lifting jaws may compress the contents of the bag, and these packing jaws, therefore, do not actually come together, there being just enough clearance between them to prevent the passage of any bag filling substance and insure that the two sides of the fabric will lie close together ready for the seaming.

We claim:—

1. In combination, means for forming a continuous flowing fabric tube comprising an inner feeding tube, means for puckering the fabric tube longitudinally upon the feeding tube, and means responsive to the longitudinal pressure of the puckered tube for controlling the operation of the tube forming means.

2. In combination, means for forming a continuous flowing fabric tube comprising an inner feeding tube, means for puckering the fabric tube longitudinally upon the feeding tube, and means responsive to the longitudinal pressure of the puckered tube for controlling the operation of the tube forming means, said controlling means comprising a ring surrounding the feeding tube, with just sufficient clearance between the ring and feeding tube to permit a gradual flow of the puckered tube therebetween, yielding means tending to move the ring against the flow of the tube, and a controlled circuit closed for operation of the tube forming means when the yielding ring moving means prevail and opened to discontinue the operation of the tube forming means when the yielding ring moving means are overcome.

3. In combination, means for forming a continuous flowing fabric tube comprising an inner feeding tube, means for puckering the fabric tube longitudinally upon the feeding tube, and means responsive to the longitudinal pressure of the puckered tube for controlling the operation of the tube forming means, said responsive means comprising a member surrounding the fabric tube and adapted to be pushed forward by the pressure of the flowing fabric.

4. In combination, means for forming a continuous flowing fabric tube comprising means for longitudinally puckering the fabric tube and means responsive to the longitudinal pressure of the puckered tube for controlling the operation of the tube forming means.

5. In combination, means for folding a fabric strip into tubular form and advancing it about an inner filling tube, means for sewing together the edges of the advancing folded strip to form a tube, means for longitudinally puckering the fabric tube, and means responsive to the pressure of the puckered tube for controlling the operation of the said advancing and sewing means.

6. In apparatus for forming a tube from a moving fabric strip, a form and means for drawing the strip thereabout and bringing the opposed lateral edges of said strip together, said means comprising edge engaging members parallel with each other and inclined to the direction of travel of the strip, and means for yieldingly forcing them toward one another to grip the edges of the strip between them.

7. In apparatus for forming a tube from a fabric strip, a stationary form, means for advancing the strip longitudinally along the form, and means for drawing the advancing tube snugly about the form, said drawing means comprising members parallel with each other and inclined to the direction of travel of the fabric and adapted to engage the opposed lateral edges of the fabric.

8. In apparatus for forming a tube from a fabric strip, a form, means for drawing the strip thereabout and bringing the opposed lateral edges of the strip together, said means comprising edge engaging members parallel with each other and inclined to the direction of travel of the strip, and means adapted to sew a seam along the edges thus brought together.

9. In combination, a form, means for drawing a continuous strip of fabric therealong, means for stretching it thereabout to bring the opposed lateral edges thereof together, means for permanently joining said edges, means for closing the tube at spaced intervals and for severing it to form separate bags, and means controlling the drawing, stretching and joining means in accordance with the operation of the closing and severing means.

10. In combination, a form, means for drawing a continuous strip of fabric therealong, means for stretching it thereabout to bring the opposed lateral edges thereof together, means for sewing a side seam along said edges to permanently join them, means for closing the tube at spaced intervals and for severing it to form separate bags, and means controlling the drawing, stretching and joining means in accordance with the operation of the closing and severing means.

11. In combination, a form consisting of two tubes, one within the other, with a free space between them, means for drawing a continuous strip of fabric therealong, means for stretching it thereabout to bring the opposed lateral edges thereof together, means for permanently joining said edges, and means for closing the tube at spaced intervals and for severing it to form separate bags.

12. In combination, a form, means for drawing a continuous strip of fabric therealong comprising feeding members engaging the fabric in opposition to the surface of the form, means for stretching the fabric about the form to bring the opposed lateral edges thereof together, means for permanently joining said edges, and means for closing the tube at spaced intervals and for severing it to form separate bags.

13. In combination, a form, means for drawing a continuous strip of fabric therealong comprising feeding rollers engaging the fabric in opposition to the surface of the form and means for rotating them in unison, means for stretching the fabric about the form to bring the opposed lateral edges thereof together, means for permanently joining said edges, and means for closing the tube at spaced intervals and for severing it to form separate bags.

14. In combination, a form, means for drawing a continuous strip of fabric therealong, means for stretching it thereabout to bring the opposed lateral edges thereof together, said stretching means comprising members which engage the surfaces of the fabric near its edge and move the edges outwardly from the form, means for permanently joining said edges, and co-ordinated means for closing the tube at spaced intervals and for severing it, adjacent each closure to form separate bags.

15. In combination, a form, means for drawing a continuous strip of fabric therealong, means for stretching it thereabout to bring the opposed lateral edges thereof together comprising rotatable rollers which engage the surfaces of the fabric near its edges and are inclined to the line of travel of the fabric, means for permanently joining said edges, and means for closing the tube at spaced intervals and for severing it to form separate bags.

16. In combination, a form, means for drawing a continuous strip of fabric therealong, means for stretching it thereabout to bring the opposed lateral edges thereof together, guide members adapted to engage the edges of the fabric and bring them into alignment, means for permanently joining said edges, and means for closing the tube at spaced intervals and for severing it to form separate bags.

17. In combination, a form, means for drawing a continuous strip of fabric therealong, means for stretching it thereabout to bring the opposed lateral edges thereof together comprising guide members against which the edges of the cloth abut and feeding members which tend to force the edges of the cloth against the guide members, means for permanently joining said edges, and means for closing the tube at spaced intervals and for severing it to form separate bags.

18. In combination, a form consisting of two tubes, one within the other, with an open space between them, means for drawing in a continuous strip of fabric therealong comprising two sets of feeding devices, both engaging the surface of the fabric, one in opposition to the inner tube and the other in opposition to the outer tube, means for stretching the fabric about the form to bring the opposed lateral edges thereof together, means for permanently joining said edges, and means for closing the tube at spaced intervals and for severing it to form separate bags.

19. In combination, a hollow form open at both ends, an inner tube extending therethrough, means for drawing a continuous strip of fabric therealong and for stretching it thereabout to bring the opposed lateral edges thereof together, means for permanently joining said edges, and means located beyond the end of the hollow form for drawing the tube thus formed down through the space between the form and the inner tube, and means for closing the tube at spaced intervals and for severing it to form separate bags.

20. In combination, a form consisting of two tubes, one within the other, with a free space between them, means for drawing a continuous strip of fabric therealong, means for stretching it thereabout to bring the opposed lateral edges thereof together, means for permanently joining said edges to form a flowing fabric tube, the inner tube extending at each end beyond the end of the outer tube and being enclosed within the flowing fabric tube, and means for closing the fabric tube at spaced intervals and for severing it to form separate bags.

21. In combination, a form consisting of two tubes, one of them substantially the same size as the tube being formed, the other of lesser cross sectional area, means for drawing a continuous strip of fabric along said tubes comprising fabric engaging members adapted to clamp the fabric against the tubes and means for driving said members at the same velocity, means for stretching the fabric about one of the form tubes, and means for joining its edges to form the fabric tube.

22. In combination, a form consisting of two tubes, one of them substantially the same size as the tube being formed, the other of lesser cross sectional area, means for drawing a continuous strip of fabric along said tubes comprising fabric engaging members adapted to clamp the fabric against the tubes and means for driving said members at the same velocity, means for stretching the fabric about one of the form tubes, means for joining its edges to form the fabric tube, means for feeding forward a continuous flowing tube of fabric, and means responsive to the flow of fabric for controlling the means for feeding it out.

23. In combination, a form consisting of two tubes, one of them substantially the same size as the tube being formed, the other of lesser cross sectional area, means for drawing a continuous strip of fabric along said tubes comprising fabric engaging members adapted to clamp the fabric against the tubes and means for driving said members at the same velocity, means for stretching the fabric about one of the form tubes, means for joining its edges to form the fabric tube, means for feeding forward a continuous flowing tube of fabric, and means responsive to the flow of fabric for controlling the means for feeding it out, said controlling means comprising a collar engaged by and adapted to be forced along with the flowing tube of fabric, and means for yieldingly resisting the movement of the collar.

24. In combination, a form consisting of two tubes, one of them substantially the same size as the tube being formed, the other of lesser cross sectional area, means for drawing a continuous strip of fabric along said tubes comprising fabric engaging members adapted to clamp the fabric against the tubes and means for driving said members at the same velocity, means for stretching the fabric about one of the form tubes, means for joining its edges to form the fabric tube, means for feeding forward a continuous flowing tube of fabric, and means responsive to the flow of fabric for controlling the means for feeding it out, said controlling means comprising a collar engaged by and adapted to be forced along with the flowing tube of fabric, means for yieldingly resisting the movement of the collar, switch members carried by the collar, and a latch associated with said switch members for resisting movement of the collar in the same direction as the tube.

25. A tube forming machine comprising a form, means for drawing a continuous strip of fabric externally therealong, means for stretching it thereabout to bring the opposed lateral edges thereof together and force them outward from said form, and a stop means engaging such edges to limit their outward movement.

26. A tube forming machine comprising a form, means for drawing a continuous strip of fabric externally therealong, means for stretching it thereabout to bring the opposed lateral edges thereof together and force them outward from said form, and a stop means engaging such edges to limit their outward movement, said stop means comprising pockets through which the edges travel as the strip passes along the form.

27. A tube forming machine comprising a form, means for drawing a continuous strip of fabric externally therealong, means for stretching it thereabout to bring the opposed lateral edges thereof together and force them outward from said form, and a stop means engaging such edges to limit their outward movement, said stop means comprising pockets through which the edges travel as the strip passes along the form, said pockets extending inwardly from the edge of the strip towards, and terminating immediately adjacent, the form.

28. A tube forming machine comprising a form, means for drawing a continuous strip of fabric externally therealong, means for stretching it thereabout to bring the opposed lateral edges thereof together, and a stop means engaging such edges to limit their lateral movement, said stop means comprising pockets through which the edges travel as the strip passes along the form, said pockets extending inwardly from the edge of the strip to, and terminating immediately adjacent, the form, a closure for each pocket adapted to be opened to permit insertion of the edges of the strip at the beginning of the operation, and means for locking said closure in position to enclose the pocket and enfold the edge in the pocket during operation.

29. A tube forming machine comprising a form, means for drawing a continuous strip of fabric therealong, means for stretching it thereabout to bring the opposed lateral edges thereof together and force them outward from the form, and a stop means engaging such edges to limit their outward movement, the strip stretching means comprising members inclined to the line of movement of the fabric and adapted to force the edge of the fabric against the stop.

30. A tube forming machine comprising a form, means for drawing a continuous strip of fabric therealong, means for stretching it thereabout to bring the opposed lateral edges thereof together and force them outward from the form, and a stop means engaging such edges to limit their outward movement, said stop means comprising a pocket through which one of the edges travels as the strip passes along the form, the strip stretching means comprising members inclined to the line of movement of the fabric and adapted to force the edge of the fabric against the stop.

31. A tube forming machine comprising a form, means for drawing a continuous strip of fabric therealong, means for stretching it thereabout to bring the opposed lateral edges thereof together and force them outward from the form, and a stop means engaging such edges to limit their outward movement, said stop means comprising a pocket through which one of the edges travels as the strip passes along the form, said pocket extending inwardly from the edge of the strip towards, and terminating immediately adjacent, the form, the strip stretching means comprising members inclined to the line of movement of the fabric and adapted to force the edge of the fabric against the stop.

32. A tube forming machine comprising a form, means for drawing a continuous strip of fabric therealong, means for stretching it thereabout to bring the opposed lateral edges thereof together, a stop means engaging such edges to limit their lateral movement, said stop means comprising a pocket through which one of the edges travels as the strip passes along the form, said pocket extending inwardly from the edge of the strip to, and terminating immediately adjacent, the form, a closure for said pocket adapted to be opened to permit insertion of the edges of the strip at the beginning of the operation, and means for locking said closure in position to enclose the pocket and enfold the edge in the pocket during operation, the strip stretching means comprising members inclined to the line of movement of the fabric and adapted to force the edge of the fabric against the stop.

33. A tube forming machine comprising a form consisting of two tubes, one of them substantially the same size as the tube being formed, the other of lesser cross sectional area, means for drawing a continuous strip of fabric along said tubes comprising fabric engaging members adapted to clamp the fabric against the tubes and means for driving said members at the same velocity, means for stretching the fabric about one of the form tubes, and means for joining its edges to form the fabric tube, the strip stretching means comprising a roller in engagement with the fabric, the axis of rotation of which is inclined to the line of movement of the strip.

34. A tube forming machine comprising a form consisting of two tubes, one of them substantially the same size as the tube being formed, the other of lesser cross sectional area, means for drawing a continuous strip of fabric along said tubes comprising fabric engaging members adapted to clamp the fabric against the tubes, and means for driving said members at the same velocity, means for stretching the fabric about one of the form tubes, means for joining its edges to form the fabric tube, means for feeding forward a continuous flowing tube, and means responsive to the flow of fabric for controlling the means for feeding it out, the strip stretching means comprising a roller in engagement with the fabric, the axis of rotation of which is inclined to the line of movement of the strip.

35. A tube forming machine comprising a form consisting of two tubes, one of them substantially the same size as the tube being formed, the other of lesser cross sectional area, means for drawing a continuous strip of fabric along said tubes comprising fabric engaging members adapted to clamp the fabric against the tubes and means for driving said members at the same velocity, means for stretching the fabric about one of the form tubes, means for joining its edges to form the fabric tube, means for feeding forward a continuous flowing tube of fabric, and means responsive to the flow of fabric for controlling the means for feeding it out, said controlling means comprising a collar, engaged by and adapted to be forced along with the flowing tube of fabric, and means for yieldingly resisting the movement of the collar, the strip stretching means comprising a roller in engagement with the fabric, the axis of rotation of which is inclined to the line of movement of the strip.

36. A tube forming machine comprising a form consisting of two tubes, one of them substantially the same size as the tube being formed, the other of lesser cross sectional area, means for drawing a continuous strip of fabric along said tubes comprising fabric engaging members adapted to clamp the fabric against the tubes and means for driving said members at the same velocity, means for stretching the fabric about one of the form tubes, means for joining its edges to form the fabric tube, means for feeding forward a continuous flowing tube of fabric, and means responsive to the flow of fabric for controlling the means for feeding it out, said controlling means comprising a collar engaged by and adapted to be forced along with the flowing tube of fabric, means for yieldingly resisting the movement of the collar, switch members carried by the collar, and a latch associated with the said switch members for resisting movement of the collar in the same direction as the tube, the strip stretching means comprising a roller in engagement with the fabric, the axis of rotation of which is inclined to the line of movement of the strip.

37. In a bag closing machine, two parallel pairs of elongated opposed jaws, means for moving them toward and from a bag, means for fastening the fabric of the bag together between the two pairs of jaws, there being a sufficient clearance between the opposed faces of the jaws to permit movement of the bag fabric transversely of said jaws, and means associated with the fastening means for severing the bag fabric between the jaws.

38. In combination, a form, means for drawing a continuous strip of fabric therealong, means for stretching it thereabout to bring the opposed lateral edges thereof together, means for forming a side seam along said edges to permanently join them, means for forming parallel pairs of transverse seams to close the tube, and means for severing the tube fabric between the two seams of each pair to form separate bags.

39. In combination, a form consisting of two tubes, one within the other, with a free space between them, means for drawing a continuous strip of fabric therealong, means for stretching it thereabout to bring the opposed lateral edges thereof together, means for forming a side seam along said edges to permanently join them, means for forming parallel pairs of transverse seams to close the tube, and means for severing the tube fabric between the two seams of each pair to form separate bags.

40. In combination, a form, means for drawing a continuous strip of fabric therealong comprising feeding members engaging the fabric in opposition to the surface of the form, means for stretching the fabric about the form to bring the opposed lateral edges thereof together, means for forming a side seam along said edges to permanently join them, means for forming parallel pairs of transverse seams to close the tube, and means for severing the tube fabric between the two seams of each pair to form separate bags.

41. In combination, a form, means for drawing a continuous strip of fabric therealong comprising feeding rollers engaging the fabric in opposition to the surface of the form and means for rotating them in unison, means for stretching the fabric about the form to bring the opposed lateral edges thereof together, means for forming a side seam along said edges to permanently join them, means for forming parallel pairs of transverse seams to close the tube, and means for severing the tube fabric between the two seams of each pair to form separate bags.

42. In combination, a form, means for drawing a continuous strip of fabric therealong, means for stretching it thereabout to bring the opposed lateral edges thereof together, guide members adapted to engage the edges of the fabric and bring them into alignment, means for forming a side seam along said edges to permanently join them, means for forming parallel pairs of transverse seams to close the tube, and means for severing the tube fabric between the two seams of each pair to form separate bags.

43. In combination, a form, means for drawing a continuous strip of fabric therealong, means for stretching it thereabout to bring the opposed lateral edges thereof together, said stretching means comprising guide members against which the edges of the cloth abut and feeding members which tend to force the edges of the cloth against the guide members, means for forming a side seam along said edges to permanently join them, means for forming parallel pairs of transverse seams to close the tube and means for severing the tube fabric between the two seams of each pair to form separate bags.

44. In combination, a form consisting of two tubes, one within the other, with an open space between them, means for drawing a continuous strip of fabric therealong comprising two sets of feeding devices, both engaging the surface of the fabric, one in opposition to the inner tube and the other in opposition to the outer tube, means for stretching the fabric about the form to bring the opposed lateral edges thereof together, means for forming a side seam along said edges to permanently join them, means for forming parallel pairs of transverse seams to close the tube, and means for severing the tube fabric between the two seams of each pair to form separate bags.

45. In combination, a form, means for drawing a continuous strip of fabric therealong, means for stretching it thereabout to bring the opposed lateral edges thereof together, means for permanently joining said edges, means for receiving the fabric tube from the form and forming transversely closing zones at spaced intervals along the length of the tube, and means for severing the tube between the limits of each such zone to form separate bags.

46. In combination, a hollow form consisting of two tubes, one within the other, with a free space between them, means for drawing a continuous strip of fabric therealong, means for stretching it thereabout to bring the opposed lateral edges thereof together, means for permanently joining said edges, means for drawing the tube, as it is formed, down between said form tubes to reverse it and place the joint on the inside thereof, means for receiving the fabric tube from the inner tube and forming transverse closing zones at spaced intervals along the length of the tube and means for severing the tube between the limits of each zone to form separate bags.

47. In combination, a form, means for drawing a continuous strip of fabric therealong, means for stretching it thereabout to bring the opposed lateral edges thereof together, means for permanently joining said edges, a common source of power for said drawing, stretching and joining means, means driven from an independent source of power for severing the tube so formed at spaced intervals into bag lengths, and means controlling the source of power of the drawing, stretching and joining means in accordance with the speed of operation of the severing means.

48. In combination, means for progressively forming a strip of fabric into a tube, a source of power for said forming means, means driven from a separate source of power for severing the tube, at spaced intervals, into bag lengths, and means controlling the source of power of the tube forming means in accordance with the speed of operation of the severing means.

49. In combination, means for progressively forming a strip of fabric into a tube, a source of power for said forming means, means driven from a separate source of power for forming the tube into bags, and means controlling the source of power of the tube forming means in accordance with the speed of operation of the bag forming means.

50. In combination, means for progressively forming a strip of fabric into a tube, means for severing the bag at spaced intervals into bag lengths, means for automatically receiving tubing from the tube forming means, forming a storage supply of the tube, and delivering it to the severing means, and means responsive to said storage supply for controlling the tube forming means.

51. In combination, means for progressively forming a strip of fabric into a tube, means for forming the tube into bags, means for automatically receiving the tube from the forming means, forming a storage supply of the tube, and delivering it to the bag forming means, and means responsive to said storage supply for controlling the operation of the tube forming means.

52. In a bag forming machine, means for forming a continuous flowing fabric tube, means for longitudinally puckering the fabric tube, and means responsive to the longitudinal pressure of the puckered tube for controlling the operation of the tube forming means, said controlling means comprising a ring surrounding the feeding tube, there being just sufficient clearance between them to permit a gradual flow of the puckered tube therebetween, yielding means tending to move the ring against the flow of the tube, and a controlled circuit closed for operation of the tube forming means when yielding ring moving means prevail and opened to discontinue the operation of the tube forming means when the yielding ring holding means are overcome.

53. In a bag forming machine, means for forming a continuous flowing fabric tube, means for longitudinally puckering the fabric tube, and means responsive to the longitudinal pressure of the puckered tube for controlling the operation of the tube forming means, said means comprising a member surrounding the fabric tube and adapted to be pushed forward by the pressure of the flowing fabric.

54. In a bag forming machine, means for forming a continuous flowing fabric tube, a collar surrounding the tube and adapted to be moved by the pressure of the flowing tube and means responsive to changes in position of said collar for controlling the flow of the tube.

55. In a bag forming machine, means for forming a continuous flowing fabric tube, a collar surrounding the tube and adapted to be moved by the pressure of the flowing tube and means responsive to changes in position of said collar for controlling the flow of the tube, a clamp for the continuous flowing fabric tube comprising a flaring member within the tube, and means for yieldingly constricting the tube thereupon.

56. In a bag forming machine, means for forming a continuous flowing fabric tube, a collar surrounding the tube and adapted to be moved by the pressure of the flowing tube and means responsive to change in position of said collar for controlling the flow of the tube, a clamp for the continuous flowing fabric tube comprising a flaring member within the tube, and means for yieldingly constricting the tube thereupon, said constricting means comprising a yielding collar surrounding the flaring member and a tube adapted to compress the tube against the member.

57. In a bag forming machine, means for forming a continuous flowing fabric tube, a collar surrounding the tube and adapted to be moved by the pressure of the flowing tube and means responsive to changes in position of said collar for controlling the flow of the tube, a clamp for the continuous flowing fabric tube comprising a flaring member within the tube, and means for yieldingly constricting the tube thereupon, said constricting means comprising a coil spring ring surrounding and of normally less diameter than the flaring member.

58. A bag forming machine containing means for forming a continuous flowing fabric tube, means in the path of such tube adapted to control the operation of the tube forming device, said means comprising a collar surrounding and engaged by the tube, and operating parts controlled by the movement of the collar.

59. A bag forming machine containing means for forming a continuous flowing fabric tube, means in the path of such tube adapted to control the operation of the tube forming device, said means comprising a collar surrounding and engaged by the tube, and operating parts controlled by the movement of the collar comprising a power circuit and circuit controlling switch members carried partially by the collar and adapted, when pressure is exerted by tubing accumulated between the forming means and collar to break the power circuit.

In testimony whereof, we affix our signatures this 30th day of April, 1919.

ADELMER M. BATES.
JOHANN E. DANCKER.